US005669406A

United States Patent [19]
Gluf, Jr.

[11] Patent Number: 5,669,406
[45] Date of Patent: Sep. 23, 1997

[54] UNIVERSAL ON/OFF SOLENOID VALVE ASSEMBLY

[75] Inventor: Carl G. Gluf, Jr., Chesterfield, Mich.

[73] Assignee: Lectron Products, Inc., Rochester Hills, Mich.

[21] Appl. No.: 617,480

[22] Filed: Mar. 15, 1996

[51] Int. Cl.[6] ........................................ F16K 31/06
[52] U.S. Cl. ................ 137/270; 251/129.14; 251/129.15
[58] Field of Search .................... 251/129.02, 129.14, 251/129.15; 137/269, 270, 271

[56] References Cited

U.S. PATENT DOCUMENTS

| | | |
|---|---|---|
| 4,391,292 | 7/1983 | Millar .............................. 251/129.14 X |
| 4,578,662 | 3/1986 | Slavin et al. . |
| 4,610,267 | 9/1986 | Beck et al. ....................... 251/129.14 X |
| 4,614,849 | 9/1986 | Miller . |
| 4,638,132 | 1/1987 | Miller . |
| 4,728,916 | 3/1988 | Fontecchio et al. . |
| 4,756,331 | 7/1988 | Stegmaier ............................ 137/271 |
| 4,783,049 | 11/1988 | Northman et al. . |
| 4,986,299 | 1/1991 | Schultz ................................ 137/269 |
| 5,088,520 | 2/1992 | Haynes et al. ....................... 137/270 |
| 5,160,116 | 11/1992 | Sugiura et al. .................. 251/129.02 X |

Primary Examiner—Kevin Lee
Attorney, Agent, or Firm—Harness, Dickey & Pierce, P.L.C.

[57] ABSTRACT

The present invention relates to an ON/OFF solenoid valve assembly which utilizes a set of common or universal components and a set of non-common or special components that can be assembled into a normally-open solenoid valve or a normally-closed solenoid valve. In particular, the common components are assembled into a base assembly onto which the non-common components are assembled to provide either of the normally-open or normally-closed solenoid valves.

4 Claims, 2 Drawing Sheets

5,669,406

UNIVERSAL ON/OFF SOLENOID VALVE ASSEMBLY

BACKGROUND OF THE INVENTION

1. Field of the Invention

The present invention relates generally to solenoid valves. More particular, the present invention relates to an ON/OFF solenoid valve assembly which utilizes a large group of universal components for assembly of either a normally-open solenoid valve or a normally-closed solenoid valve, with a minimum number of non-interchangeable components required for adapting from a normally-closed solenoid valve to a normally-open solenoid valve and vice-versa.

2. Description of Background Art

Solenoid valves are commonly used in fluid (i.e., hydraulic and pneumatic) systems for controlling pressure and/or flow. As is known, solenoid valves of the "ON/OFF" variety are designed to be either normally-closed or normally-open. Moreover, conventional ON/OFF solenoid valves are not typically designed to include interchangeable components that can be used to assembly either a normally-closed version or a normally-open version of the solenoid valve. Thus, manufacturers of solenoid valves have previously been required to manufacture and keep in stock separate components for assembly of different normally-closed and normally-opened solenoid valves.

Conventional production of non-interchangeable components for normally-closed solenoid valves and for normally-open solenoid valves generally requires separate machines and dies which increases the overall cost of manufacturing and assembling the solenoid valves. In addition, the requirement of maintaining additional storage space for keeping both normally-closed and normally-open solenoid valve components in stock greatly increases the cost of doing business in this highly competitive marketplace. Thus, it is desirable in the field of solenoid valves to provide a "universal" solenoid valve assembly which utilizes a majority of interchangeable components for assembly into either a normally-open solenoid valve or a normally-closed solenoid valves.

SUMMARY OF THE INVENTION

Accordingly, it is an object of the present invention to provide a universal ON/OFF solenoid valve assembly that includes a set of common components for use in assembling either a normally-open solenoid valve or a normally-closed solenoid valve.

It is still another object of the present invention to provide a universal ON/OFF solenoid valve assembly which is relatively simple in structure so as to permit economical mass production thereof.

These and other objects of the present invention are obtained by providing a group of components, cumulatively referred to as ON/OFF solenoid valve assembly, comprised of a set of "universal" components that can be assembled into a base assembly and a set of non-common or "special" components selectively assembled into the base assembly to provide a normally-open solenoid valve or a normally-closed solenoid valve. The base assembly includes a solenoid having a coil winding and an armature adapted to move from a first position to a second position in response to electrical energization of the coil winding, a valve body secured to the solenoid and defining an inlet port, a fluid chamber, a first flow passageway between the inlet port and the fluid chamber, a control chamber, a second flow passageway between the fluid chamber and the control chamber, and a first valve member. The set of special components adapted for use with the base assembly include a first rod, a second rod, a second valve member, and a valve actuator. In the normally-open solenoid valve, the first rod is coupled to the armature and engages the first valve member positioned within the fluid chamber. As such, movement of the armature from the first position to the second position causes the first valve member to move from a normally open position whereat fluid flow between the inlet port and the fluid chamber is permitted to a closed position whereat fluid flow between the inlet port and the fluid chamber is inhibited. In the normally-closed solenoid valve, the second rod is coupled to the armature and engages the first valve member located within the control chamber, the second valve member is retained in the inlet port, and the valve actuator is retained in the fluid chamber and has a first projection engaging the first valve member and a second projection engaging the second valve member. As such, movement of the armature from the first position to the second position causes the second valve member to move from a normally closed position whereat fluid flow from the inlet port to the fluid chamber is inhibited to an open position whereat fluid flow from the inlet port to the fluid chamber is permitted.

Further scope of applicability of the present invention will become apparent from the detailed description given hereinafter. However, it should be understood that the detailed description and specific examples, while indicating presently preferred embodiments of the invention, are given by way of illustration only since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings wherein.

DETAILED DESCRIPTION OF THE PREFERRED EMBODIMENTS

Figure 1:
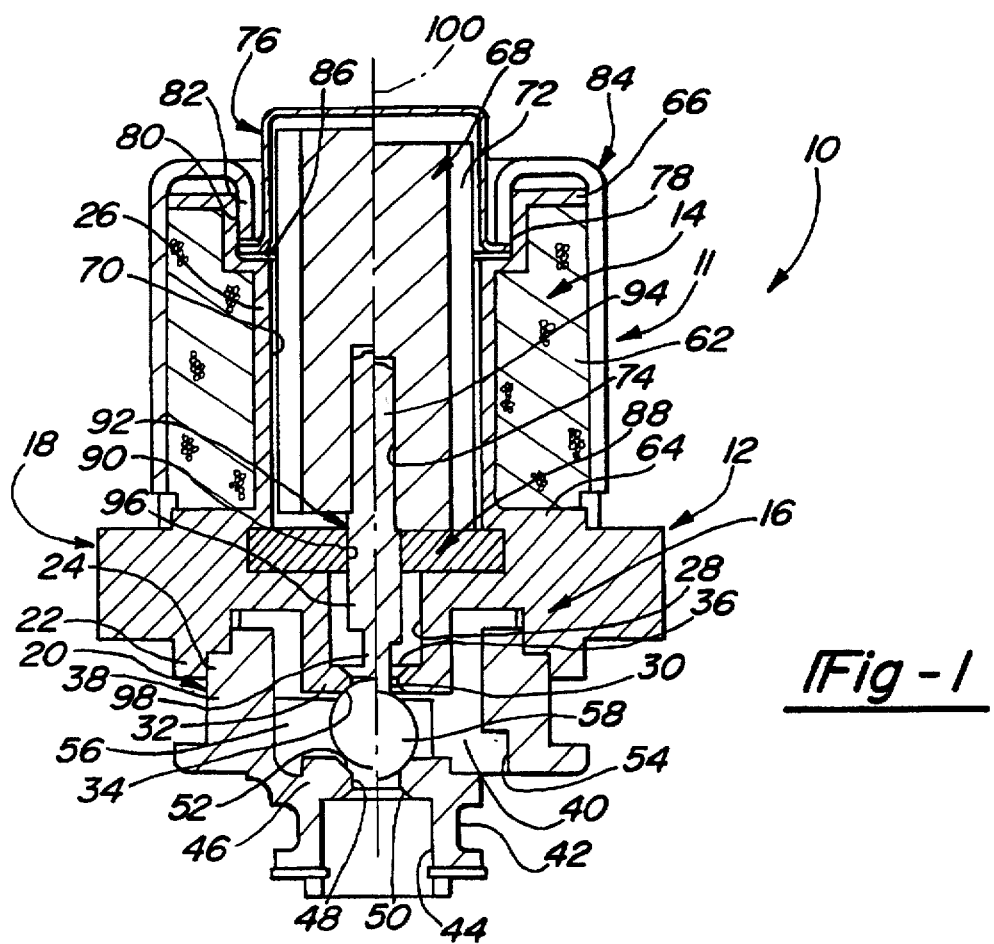
FIG. 1 is a section view of a normally-open solenoid valve assembled from the components of the universal ON/OFF solenoid valve assembly according to a preferred embodiment of the present invention.
Figure 2:
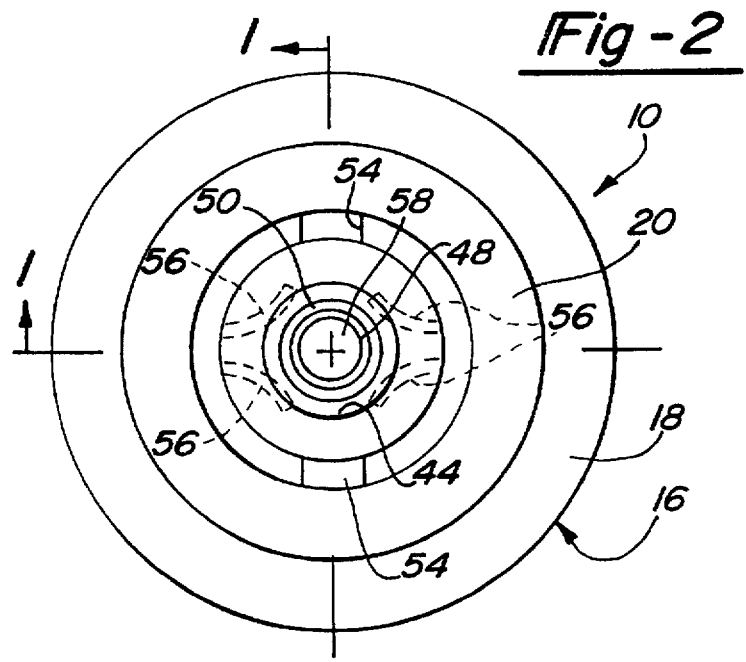
FIG. 2 is a bottom view of the normally-open solenoid valve shown in FIG. 1 and illustrating the section line A—A through which the cross-sectional view of FIG. 1 is taken.
Figure 3:
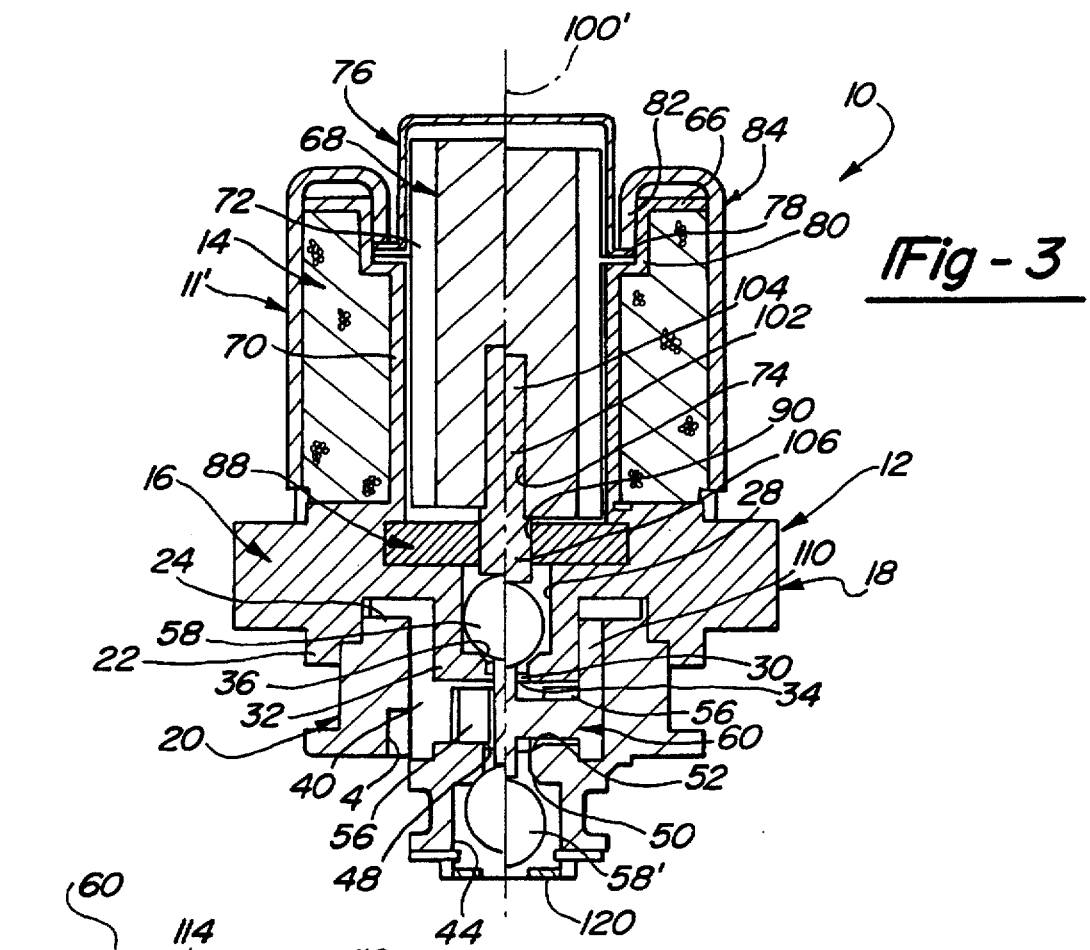
FIG. 3 is a section view of the normally-closed solenoid valve assembled from the components of the universal ON/OFF solenoid valve assembly according to the preferred embodiment of the present invention.
Figure 5:
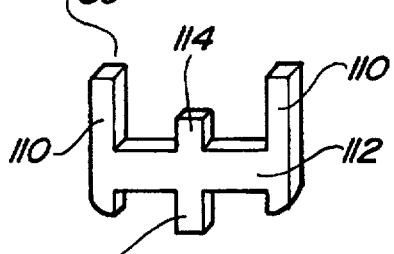
FIG. 5 is a perspective view of valve actuator component used in the normally-closed solenoid valve according to the principles of the present invention.
Figure 4:
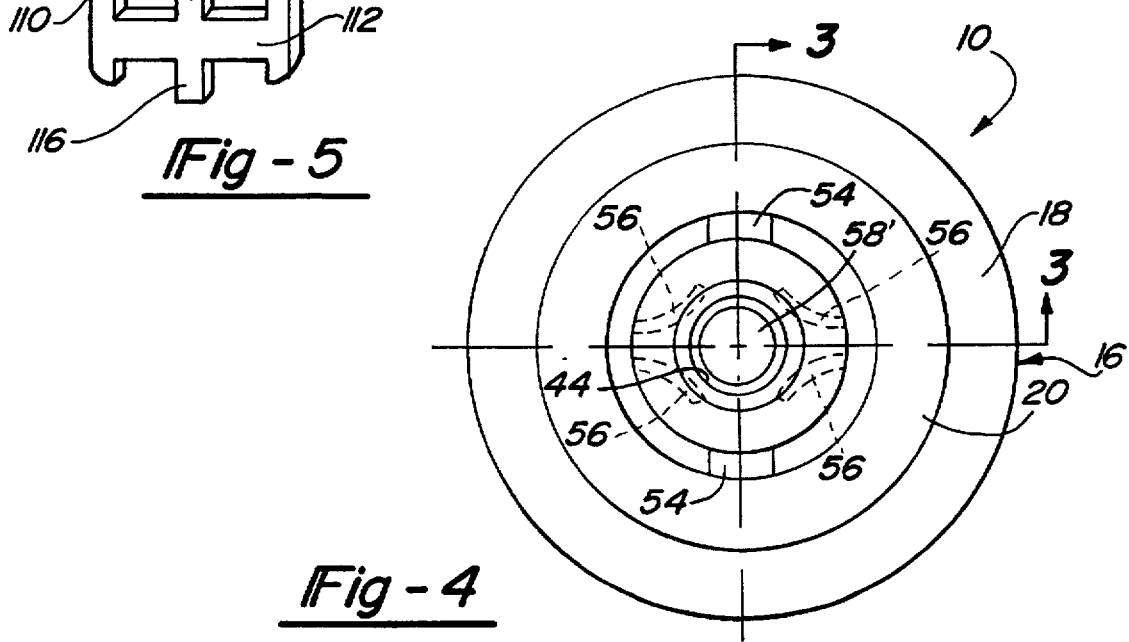
FIG. 4 is a bottom view of the normally-closed solenoid valve shown in FIG. 3 and illustrating the section line B—B through which the cross-sectional view of FIG. 3 is taken.

In general, the present invention is related to a group of components, hereinafter cumulatively referred to as ON/OFF solenoid valve assembly 10, comprised of a set of common (i.e., "universal") components and a set of non-common (i.e., "special") components that can be assembled into a normally-open solenoid valve 11 or a normally-closed solenoid valve 11'. FIGS. 1 and 2 illustrate the universal and special components associated with normally-open solenoid valve 11. In contrast, FIGS. 3 and 4 illustrate the universal and special components associated with normally-closed solenoid valve 11'. Due to the substantial structural similarity between solenoid valves 11 and 11', the universal components are hereinafter identified by the same reference numerals.

BASE STRUCTURE

With particular reference to FIGS. 1 and 3, ON/OFF solenoid valve assembly 10 is shown to include a set of universal components that can be assembled into a base assembly 12 which is common to both normally-open solenoid valve 11 and normally-closed solenoid valve 11'. In general, base assembly 12 includes a solenoid 14 and a valve body 16. Valve body 16 is a two-piece assembly comprised of a body member 18 and a nose member 20. Body member 18 includes an annular stepped mounting flange 22 that is adapted to receive a corresponding annular stepped mounting flange 24 on nose member 20. Suitable means (i.e., welding, fasteners, etc.) are used for securing mounting flanges 22 and 24 together to provide a fluid tight seal between body member 18 and nose member 20. Body member 18 also is formed to include an upstanding tubular bobbin 26, a central control chamber 28, a flow passageway 30 formed through an end segment 32 and which communicates with control chamber 28, and first and second ball seats 34 and 36, respectively, which are defined by chamfered edge surfaces formed on opposite ends of flow passageway 30.

Nose member 20 includes a first tubular portion 38 defining a fluid chamber 40, a second tubular portion 42 defining an inlet port 44, and an intermediate wall portion 46 interconnecting first tubular portion 38 to second tubular portion 42 with a flow passageway 48 providing a fluid communication pathway between inlet port 44 and fluid chamber 40. As will be appreciated, inlet port 44 is adapted to be coupled to any suitable inlet or supply line of a fluid-controlled system. Nose member 20 also includes first and second valve seats 50 and 52, respectively, formed as chamfered edge surfaces along opposite ends of flow passageway 48, and a pair of outlet ports 54 communicating with fluid chamber 40. Similarly, outlet ports 54 are adapted to be coupled to any suitable outlet, discharge, or return line of the fluid-controlled system. Furthermore, a pair of guide fingers 56 are provided on opposite sides of fluid chamber 40 for the purpose of retaining a valve ball 58 of normally-open solenoid valve 11 or an actuator plate 60 of normally-closed solenoid valve 11' centrally within fluid chamber 40 for movement therein. As seen, each guide finger 56 has an arcuate shape with its terminal end generally aligned with an edge of one of outlet ports 54. Guide fingers 56 can be integral projections formed to extend into fluid chamber 40 from the inner wall of first tubular portion 38 of nose member 20 or, in the alternative, can be extensions of a separate bifurcated component mounted therein.

As noted, base assembly 12 of ON/OFF solenoid valve 10 includes solenoid 14 which is comprised of a coil winding 62 encircling bobbin 26 between a radial surface 64 on body member 18 and a radial end flange 66 of bobbin 26. The ends of coil winding 62 are connected to blade-like terminals (not shown) which, in turn, are connected to a remote electrical power source that is operable to supply an electrical signal for selectively energizing coil windings 62. An armature 68 is disposed within a long central aperture 70 of bobbin 26.

Armature 68 has a plurality of longitudinally-extending radial vanes 72 extending outwardly therefrom and a central bore 74 formed in a first end thereof. A cap 76 is provided to enclose a second end of armature 68. Cap 76 includes a radial flange 78 that is received in an outwardly stepped portion 80 of bobbin 26 and held in place by a bent-over flange portion 82 of a cup-shaped housing 84, the remainder of which encloses coil winding 60. The opposite end of housing 84 is secured to body member 18. A washer 86 is shown interposed between stepped portion 80 of bobbin 26 and radial flange 78 of cap 76 for assisting in preventing dirt infiltration. Finally, a flux plate 88 is disposed between body member 18 and armature 68 and includes a central opening 90. Energization of coil winding 62 causes an attractive magnetic force to be exerted on armature 68 for urging it to move toward flux plate 68. This action occurs through a magnetic conduction or flux path in which magnetic fields are transferred from the housing 68 across the radial working air gap to the armature 68 across the working air gap to the flux plate 68. Thus, the above-described components define base assembly 12 of ON/OFF solenoid valve 10 according to the preferred embodiment of the present invention. Base assembly 12 of ON/OFF solenoid valve 10 is readily adaptable for use with a set of special components for assembly of either normally-open solenoid valve 11 or a normally-closed solenoid valve 11', as will be described hereinafter with respect to FIGS. 1-2 and 3-4, respectively.

NORMALLY-OPEN SOLENOID VALVE

In normally-open solenoid valve 11, as shown in FIGS. 1 and 2, the above-noted universal components of base assembly 12 are combined with a special component, namely a normally-open (N.O.) rod 92. N.O. rod 92 includes a first end segment 94 which is fixedly mounted in central bore 74 of armature 68. N.O. rod 92 also includes a larger diameter intermediate segment 96 which is slidingly received in central opening 90 of flux plate 88 and establishes a sealed fit therewith. Finally, N.O. rod 92 includes a reduced diameter second end segment 98 which extends longitudinally from intermediate segment 96 and engages valve ball 58 which, in turn, is disposed in fluid chamber 40 for movement between first ball seat 34 of body member 18 and second valve seat 52 of nose member 20. As noted, the curved terminal end portions of guide fingers 56 are oriented to guide valve ball 58 for movement in fluid chamber 40 between positions of engagement with one of first ball seat 34 and second valve seat 52.

A central axis of normally-open solenoid valve 11 is illustrated in FIG. 1 by reference numeral 100 with the movable components of solenoid valve 11 shown on the left side of axis 100 in their non-actuated "normally-open" state positions and shown on the right side of axis 100 in their actuated "closed" state positions. Specifically, in the left half portion of FIG. 1, the normally-open configuration of ON/OFF solenoid valve 10 is shown with solenoid 14 in a de-energized state wherein armature 68 and N.O. rod 92 are located in a valve "open" position such that valve ball 58 is displaced from second valve seat 52 of nose member 20, thus allowing fluid to flow through inlet port 44 into fluid chamber 40 and out of outlet ports 54. Due to the pressure of the fluid acting on valve ball 58 within flow passageway 48, valve ball 58 is forcibly pressed against first ball seat 34 of body member 18 when solenoid 14 is in its de-energized state. As such, valve ball 58 seals flow passageway 30 for preventing fluid from entering control chamber 28. However, when solenoid 14 is energized by supplying an electrical signal to coil winding 62 of ON/OFF solenoid valve 10, the magnetic fields generated cause armature 68 and N.O. rod 92 to move toward a valve "closed" position, as shown in the right half portion of FIG. 1. As N.O. rod 92 moves to its valve closed position, its second end segment 98 forces valve ball 58 against second valve seat 52 of nose member 20, thereby interrupting the flow of fluid from inlet port 44 into fluid chamber 40.

Assembly of normally-open solenoid valve 11 requires inserting valve ball 58 in fluid chamber 40 between guiding fingers 56 of nose member 20 prior to mating flange 24 of nose member 20 with flange 22 of body member 18. In addition, first end segment 94 of N.O. rod 92 is inserted into central bore 74 of armature 68. N.O. rod 92 and armature 68 are then inserted into tubular portion 70 of bobbin 26 such that intermediate segment 96 of N.O. rod 92 is received in central opening 90 of flux plate 88 and control chamber 28 of body member 18. Cap 76 is then placed over the end of armature 68 so that radial flange 78 abuts against stepped portion 80 of bobbin 26. Housing 84 is then inserted over coil winding 62 and fixed to body member 18. Alternatively, if housing 84 is previously mounted to enclose coil winding 62, then its flange portion 82 can be subsequently staked to entrap cap flange 78.

NORMALLY-CLOSED SOLENOID VALVE

With reference to FIGS. 3 and 4, the special components used in association with the above-described base assembly 12 for assembling normally-closed solenoid valve 11' will be described. In FIG. 3, base assembly 12 of ON/OFF solenoid valve 10 is shown combined with special components including a normally-closed or N.C. rod 102, valve actuator 60, a second valve ball 58', and a retainer ring 120. In comparing FIG. 3 to FIG. 1, N.C. rod 102 is generally similar to N.O. rod 92 with the exception that second end segment 98 has been truncated therefrom. As such, N.C. rod 102 includes a first end segment 104 fixedly received in central bore 74 of armature 68 and a larger diameter second end segment 106 which is slidingly received in central opening 90 of flux plate 88. The terminal end of N.C. rod 102 engages valve ball 58 which, in this arrangement, is disposed in control chamber 28 of body member 18 for movement relative to second ball seat 36. Valve actuator 60 is disposed for sliding movement in fluid chamber 40 and is held in place between opposing pairs of guide fingers 56. Valve actuator 60 includes a pair of longitudinally-extending support arms 110, formed at the opposite ends of a crossrail 112, which are disposed adjacent to the outer wall of fluid chamber 40. Valve actuator 60 also includes a first or upper projection 114 which extends through flow passageway 30 and contacts valve ball 58 disposed in control chamber 28 in body member 18. Valve actuator 60 also includes a second projection 116 which extends through flow passageway 48 and contacts second valve ball 58' disposed in inlet port 44. Second ball 58' is movable with respect to first valve seat 50 of nose member 20. Retainer plate 120 is a ring-like member provided for retaining second valve ball 58' within inlet port 44.

A central axis 100' is provided such that the left half portion of FIG. 3 illustrates the de-energized state of solenoid 14 in normally-closed solenoid valve 11'. In the de-energized state, armature 68 and N.C. rod 102 are located in a valve "closed" position with armature 68 displaced from flux plate 88. With armature 68 and N.C. rod 102 in the valve closed position; the fluid pressure within inlet port 40 acts on second valve ball 58' which, in turn, causes projection 114 on actuator 60 to hold valve ball 58 in a position away from second ball seat 36 of base member 18, thus locating valve actuator 60 in its corresponding normally closed position. When valve actuator 60 is in its normally closed position, second valve ball 58' is seated against first valve seat 50 of nose member 20, thus closing inlet port 44 from communication with fluid chamber 40.

As shown in the right half portion of FIG. 3, solenoid 14 of ON/OFF solenoid valve assembly 10 is shown in an energized state wherein armature 68 and N.C. rod 102 are caused to move toward flux plate 84 to a valve "open" position. As N.C. rod 102 moves to its valve open position, it forces valve ball 58 against second ball seat 36 of body member 18, thereby closing flow passageway 30. As valve ball 58 is forced against second ball seat 36 of body member 18, valve actuator 60 is forced to slide downwardly to its valve open position, thereby forcing second valve ball 58' away from first valve seat 50 and thus allowing fluid to flow through inlet port 44 into fluid chamber 40 and out through outlet passages 54.

Assembly of normally-closed solenoid valve 11' requires inserting valve ball 58 in control chamber 28 of body member 18 prior to inserting flux plate 88 therein. First end segment 104 of N.C. rod 102 is then inserted into central bore 74 of armature 68. N.C. rod 102 and armature 68 are then inserted into bobbin 26 such that second end segment 106 of N.C. rod 102 is received in central opening 90 of flux plate 88. Cap 76 is then placed over the end of armature 68 so that the radial flange 78 abuts against stepped portion 80 of bobbin 26. Housing 84 is then inserted over stationary coil 62. Prior to mating nose member 20 with base member 18, valve actuator 60 is inserted in fluid chamber 40 between guide fingers 56. Nose member 20 is then mated with body member 18 and second valve ball 58' is placed in inlet port 44 of nose member 20 and retainer plate 120 is installed. Means can optionally be provided for securing second ball 58' in cylindrical inlet port 44. For example, the outer edge of cylindrical inlet port 44 can be swaged in order to provide a diameter small than that of second valve ball 58'.

As can be understood from the above description, ON/OFF solenoid valve assembly 10 is provided with a base assembly 12 comprised of common or "universal" elements which can be used for assembly either of normally-open solenoid valve 11 or normally-closed solenoid valve 11'. Furthermore, ON/OFF solenoid valve assembly 10 requires the interchange of a minimal number of special parts in order to achieve a normally-closed or a normally-open arrangement. The common usage of the universal components of ON/OFF solenoid valve assembly 10 will allow a manufacturer to reduce the overall machinery and manpower required for manufacturing both normally-open and normally-closed solenoid valves. In addition, the storage space required for maintaining a ready stock of valve assembly components is greatly reduced since a manufacturer no longer is required to store solenoid valve components for separately designed normally-open and normally-closed solenoid valves. In addition, because valve balls 58 and 58' are preferably of the same diameter, only one stock of such valve balls is required.

The assembly of either of normally-open solenoid valve 11 or normally-closed solenoid valve 11' is very simple according to the present invention. Although the order in which parts are assembled varies, no special machinery is required for fastening the components together. The invention being thus described, it will be obvious that the same may be varied in many ways. Such variations are not to be regarded as a departure from the spirit and scope of the invention, and all such modifications as would be obvious to one skilled in the art are intended to be equivalent within the scope of the following claims.

What is claimed is:

1. An on/off solenoid valve assembly comprising:

a base assembly including a solenoid having a coil winding and an armature adapted to move from a first position to a second position in response to electrical energization of said coil winding, a valve body secured to said solenoid and defining an inlet port, a fluid chamber, a first flow passageway between said inlet port and said fluid chamber, a control chamber, and a second flow passageway between said fluid chamber and said control chamber, and a first valve member; and a set of components adapted for use with said base assembly to provide one of a normally-open solenoid valve and a normally-closed solenoid valve, said set including a first rod, a second rod, a second valve member, and a valve actuator, in said normally-open solenoid valve said first rod is coupled to said armature and engages said first valve member positioned within said fluid chamber such that movement of said armature from said first position to said second position causes said first valve member to move from a normally open position whereat fluid flow between said inlet port and said fluid chamber is permitted to a closed position whereat fluid flow between said inlet port and said fluid chamber is inhibited, and in said normally-closed solenoid valve said second rod is coupled to said armature and engages said first valve member located within said control chamber, said second valve member is retained in said inlet port, and said valve actuator is retained in said fluid chamber and has a first projection engaging said first valve member and a second projection engaging said second valve member such that movement of said armature from said first position to said second position causes said second valve member to move from a normally closed position whereat fluid flow from said inlet port to said fluid chamber is inhibited to an open position whereat fluid flow from said inlet port to said fluid chamber is permitted.

2. An on/off solenoid valve assembly comprising:

a first set of components that can be commonly assembled into a base assembly for use with either a normally-open solenoid valve or a normally-closed solenoid valve, said first set including a solenoid having a coil winding and an armature adapted to move from a first position to a second position in response to electrical energization of said coil winding, a valve body secured to said solenoid and defining an inlet port, a fluid chamber, a first flow passageway between said inlet port and said fluid chamber, a control chamber, and a second flow passageway between said fluid chamber and said control chamber, and a first valve member; and a second set of components adapted for use with said base assembly and including a first rod, a second rod, a second valve member, and a valve actuator;

in said normally-open solenoid valve said first rod is coupled to said armature and engages said first valve member positioned within said fluid chamber such that movement of said armature from said first position to said second position causes said first valve member to move from a normally open position permitting fluid communication from said inlet port to said fluid chamber to a closed position preventing fluid from flowing from said inlet port to said fluid chamber; and in said normally-closed solenoid valve said second rod is coupled to said armature and engages said first valve member located within said control chamber, said second valve member is retained in said inlet port, and said valve actuator is retained in said fluid chamber and engages said first and second valve members such that movement of said armature from said first position to said second position causes said second valve member to move from a normally closed position whereat said second valve member prevents fluid flow from said inlet port to said fluid chamber to an open position whereat said second valve member is positioned so as to permit fluid flow from said inlet port to said fluid chamber.

3. A convertible on/off solenoid valve comprising:

a solenoid having a coil winding and an armature adapted to move from a first position to a second position in response to electrical energization of said coil winding;

a valve body secured to said solenoid and defining an inlet port, a fluid chamber, a first flow passageway between said inlet port and said fluid chamber, a control chamber, and a second flow passageway between said fluid chamber and said control chamber;

a first valve member;

a first rod;

a second rod;

a second valve member; and a valve actuator member;

said on/off solenoid valve is convertible between either of a normally-open solenoid valve or a normally-closed solenoid valve, in said normally-open solenoid valve said first rod is coupled to said armature and extends through said control chamber and said second flow passageway for engagement with said first valve member which is positioned within said fluid chamber such that movement of said armature from said first position to said second position causes said first rod to move said first valve member from a normally open position permitting fluid communication between said inlet port and said fluid chamber to a closed position preventing fluid flow between said inlet port and said fluid chamber; and in said normally-closed solenoid valve said second rod is fixed to said armature and engages said first valve member which is located within said control chamber, said second valve member is retained in said inlet port, and said valve actuator is retained in said fluid chamber and has first means extending through said first flow passageway for engagement with said second valve member and second means extending through said second flow passageway for engagement with said first valve member, such that movement of said armature from said first position to said second position causes said second valve member to move from a normally closed position whereat said second valve member prevents fluid flow from said inlet port to said fluid chamber to an open position whereat said second valve member is position so as to permit fluid flow from said inlet port to said fluid chamber.

4. A universal on/off solenoid valve, comprising:

a coil;

an armature disposed in said coil;

a body member connected to said coil and having a first and a second ball seats; and a nose member connected to said body member and having a first and a second valve seats;

said universal on/off solenoid assembly is convertible from a normally-open solenoid valve having a first rod connected to said armature and movable to engage a valve ball disposed between said first ball seat of said body member and said second valve seat of said nose member, to a normally-closed solenoid valve having a second rod connected to said armature and engaging a valve ball associated with said second ball seat of said body member and a ball actuator disposed between said body member and said nose member and which is movable to engage said valve ball associated with said second seat and a second valve ball associated with said first valve seat of said nose piece.

* * * * *